United States Patent

Watanabe et al.

[11] Patent Number: 5,930,381
[45] Date of Patent: *Jul. 27, 1999

[54] BOARD RECOGNIZING APPARATUS AND METHOD

[75] Inventors: Hideaki Watanabe; Kiyoshi Imai; Dai Yokoyama, all of Kofu, Japan

[73] Assignee: Matsushita Electric Industrial Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/769,378

[22] Filed: Dec. 19, 1996

[30] Foreign Application Priority Data

Dec. 20, 1995 [JP] Japan .................................... 7-331363

[51] Int. Cl.⁶ ........................................................ G06K 9/36
[52] U.S. Cl. ........................... 382/145; 382/141; 382/146; 382/147; 382/149
[58] Field of Search ..................................... 382/145, 147, 382/149, 151, 152, 141, 146; 358/474, 487, 497

[56] References Cited

U.S. PATENT DOCUMENTS

| | | | |
|---|---|---|---|
| 5,260,779 | 11/1993 | Wasserman | 382/147 |
| 5,384,711 | 1/1995 | Kanai et al. | 364/489 |
| 5,461,480 | 10/1995 | Yamada et al. | 356/394 |
| 5,493,594 | 2/1996 | Hamada et al. | 378/34 |
| 5,528,359 | 6/1996 | Taguchi | 356/237 |
| 5,589,952 | 12/1996 | Sato et al. | 358/487 |
| 5,687,209 | 11/1997 | Adams | 378/22 |

*Primary Examiner*—Edward L. Coles
*Assistant Examiner*—Mark Wallerson
*Attorney, Agent, or Firm*—Wenderoth, Lind & Ponack, L.L.P.

[57] ABSTRACT

The apparatus includes a light source section, a recognizing section, a moving device, and an operating section. The light source section is disposed transversely of a board so as to illuminate one side of the board. The recognizing section includes lenses, which are disposed transversely of the board so as to face the board from an opposite side relative to the light source section. The recognizing section also includes line image sensors disposed transversely of the board for receiving light rays from the lenses. The moving device is operable to move both the light source section and the recognizing section without changing the relative positions of these sections but moves them in such a way as to change their respective positions relative to the board. The operating section is operable to calculate image data for the entire board from image information obtained by the recognizing section and from position information obtained by the moving device.

22 Claims, 4 Drawing Sheets

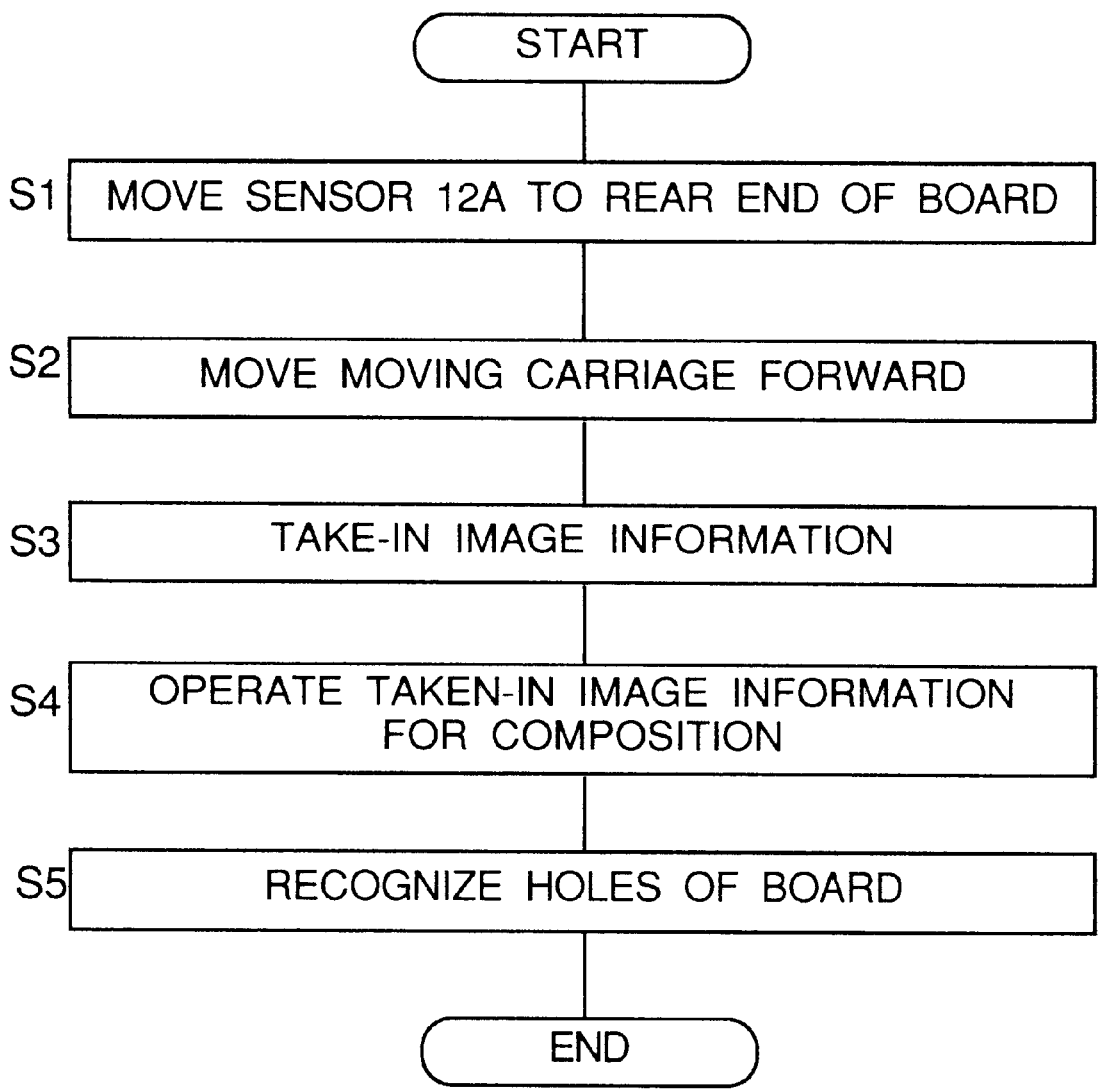

BOARD RECOGNIZING APPARATUS AND METHOD

BACKGROUND OF THE INVENTION

The present invention relates to a board recognizing apparatus and method for recognizing a position of a hole located at a specified location on a circuit board for use in an electronic component mounting process in which a lead of an electronic component is fitted into such a hole.

A conventional arrangement of a board recognizing apparatus for recognition of hole positions in a circuit board is explained with reference to FIGS. 3 to 5.

In FIG. 3, the conventional board recognizing apparatus includes a belt 23 and rails 24 in combination for moving a circuit board 20. The apparatus also includes a light source 21 fixed above the circuit board 20. The light source 21 has substantially the same width as the circuit board 20. The apparatus also includes a compact line sensor 22 fixed beneath the circuit board 20. The sensor 22 has a condenser lens. In an alternative, the light source 21 may be fixed beneath the circuit board 20, and the compact type line sensor 22 may be fixed above the circuit board 20.

Next, operation of the conventional arrangement is explained with reference to FIGS. 3 to 5.

In FIGS. 3 to 5, when light is projected from the light source 21 toward the circuit board 20 as the circuit board 20 is moved by means of the belt 23 and rails 24 as shown in FIG. 3, light rays passing through holes 20a, 20b, 20c of the circuit board 20 are allowed to pass through the condenser lens for incidence on the compact type line sensor 22. Thus, positions of the holes 20a, 20b, 20c can be recognized by the compact type line sensor 22.

However, the foregoing conventional arrangement involves the following issues.

(1). As FIG. 4 shows, the angle of incidence θ of the light rays falling on the compact type line sensor 22 is such that, when the hole 20a is located at the middle of the board 20, the angle is zero. The angle becomes proportionally larger as the hole position gets nearer to the position of either of the holes 20b, 20c located at edge portions of the board 20. Therefore, while the hole 20a located at the middle of the board 20 can be recognized to be of a circular shape in the case where the holes 20a, 20b, 20c are circular in shape, the holes 20b, 20c at edge portions of the board 20 will be recognized to be of a distorted circular shape. As such, positions of the centers of the holes 20b and 20c may not be accurately recognized.

(2). As FIG. 5 illustrates, where the board 20 has electronic components 25, 25 mounted thereon, the hole 20b goes out of sight because of the component 25. Therefore, the hole cannot be recognized.

(3). Since the number of pixels of the compact type line sensor 22 is limited, the reading range of the sensor must be reduced if higher image resolution is to be obtained for enabling image recognition. Correspondingly, if the reading range is to be increased, the resolution aspect must be sacrificed.

(4). The speed of movement in a direction perpendicular to the compact type line sensor 22, that is, the speed of movement in the direction of transport of the board 20 must be uniform, or otherwise a read image is subject to expansion and contraction and cannot be relied upon for recognition of accurate position. Therefore, a high precision control is required to maintain the speed of transport of the board 20 at a uniform level.

(5). Since the board 20 moves relative to the recognizing section, it is required that at the recognizing section the belt 23 and rails 24 be twice as long as the board 20. This poses a limitation upon the ability to reduce the size of the board recognizing apparatus.

SUMMARY OF THE INVENTION

Accordingly, an object of the present invention is to provide a board recognizing apparatus and method which enable accurate recognition of a hole position within a board irrespective of the size of the board and irrespective of the presence or absence of a pre-mounted electronic component.

In accomplishing these and other aspects, according to a first aspect of the present invention, there is provided a board recognizing apparatus comprising elements characterized as follows.

A light source section has a light source disposed transversely of a board so as to illuminate one surface of the board. The board has a hole for inserting a lead of a component.

A recognizing section includes a lens disposed transversely of the board so as to face the board from an opposite side relative to the light source section. The recognizing section also includes a line image sensor disposed transversely of the board for receiving light rays passing through the lens.

A moving device is provided for moving both the light source section and the recognizing section without changing the relative position of these sections. The light source and recognizing sections are moved in such a way as to change their respective positions relative to the board.

An operating section is provided for calculating image data for an entire board from image information obtained by the recognizing section and position information obtained by the moving device.

According to a second aspect of the present invention, there is provided a board recognizing apparatus as set forth in the first aspect, wherein the lens and the line image sensor are each plural in number, and wherein the operating section composes pieces of image information from the plurality of line image sensors.

According to a third aspect of the present invention, there is provided a board recognizing apparatus as set forth in the first aspect, wherein the moving device is operative to move the light source section and the recognizing section integrally with each other toward the board at a stop position, i.e., a stationary position.

According to a fourth aspect of the present invention, there is provided a board recognizing apparatus as set forth in the second aspect, wherein the moving device is operative to move the light source section and the recognizing section integrally with each other toward the board at a stop position.

According to a fifth aspect of the present invention, there is provided a board recognizing apparatus as set forth in the first aspect, wherein the image data for the entire board from the image information obtained by the recognizing section and the position information obtained by the moving device is calculated while the board is placed on a transport device for transporting the board.

According to a sixth aspect of the present invention, there is provided a board recognizing apparatus as set forth in the second aspect, wherein the image data for the entire board from the image information obtained by the recognizing section and the position information obtained by the moving device is calculated while the board is placed on a transport device for transporting the board.

According to a seventh aspect of the present invention, there is provided a board recognizing apparatus as set forth in the third aspect, wherein the image data for the entire board from the image information obtained by the recognizing section and the position information obtained by the moving device is calculated, while the board is placed on a transport device for transporting the board.

According to an eighth aspect of the present invention, there is provided a board recognizing apparatus as set forth in the fourth aspect, wherein the image data for the entire board from the image information obtained by the recognizing section and the position information obtained by the moving device is calculated while the board is placed on a transport device for transporting the board.

According to a ninth aspect of the present invention, there is provided a board recognizing method as follows.

One surface of a board is illuminated by a light source section having a light source disposed transversely of the board. The board has a hole for inserting a lead of a component.

Light rays passing through a lens are received by a line image sensor disposed transversely of the board. A recognizing section is disposed transversely of the board so as to face the board from an opposite side relative to the light source section. The recognizing section includes the lens and the line image sensor.

The light source section and the recognizing section are moved by a moving device without changing the relative position of these sections. The light source and recognizing section are moved. in such a way as to change their respective positions relative to the board.

Image data for an entire board is calculated by an operating section from image information obtained by the recognizing section and position information obtained by the moving device.

According to a tenth aspect of the present invention, there is provided a board recognizing method as set forth in the ninth aspect, wherein in calculating the image data, when the lens and the line image sensor are each plural in number, the operating section composes pieces of image information from the plurality of line image sensors.

According to an eleventh aspect of the present invention, there is provided a board recognizing method as set forth in the ninth aspect, wherein in moving both the light source section and the recognizing section, the moving device is operative to move the light source section and the recognizing section integrally with each other toward the board at a stop position.

According to a twelfth aspect of the present invention, there is provided a board recognizing method as set forth in the tenth aspect, wherein in moving both the light source section and the recognizing section, the moving device is operative to move the light source section and the recognizing section integrally with each other toward the board at a stop position.

According to a thirteenth aspect of the present invention, there is provided a board recognizing method as set forth in the ninth, tenth, eleventh, or twelfth aspect, wherein in calculating the image data, the image data for the entire board from the image information obtained by the recognizing section and the position information obtained by the moving device is calculated while the board is placed on a transport device for transporting the board.

According to the above arrangement of the first and ninth aspects, the light rays entering the line image sensor of the recognizing section are light rays which are emitted, for example, vertically downward from the light source section and which are passed through the hole of the board from above in a vertically downward direction. The light rays have thus passed through the lens, for example, vertically downward from above. In other words, the line image sensor views the portion to be recognized from right below or from right above. Therefore, the line image sensor can accurately recognize the configuration of a hole of the board, thus eliminating the issue of image distortion at board edge portions which would occur when a line sensor of the conventional compact type is used. Even where the board has an electronic component previously mounted on the underside thereof, there will be no occurrence of field-of-view shadow due to such an electronic component, and the entirety of the board can thus be accurately recognized.

In order to solve the aforesaid issues, according to the second and tenth aspects, there are provided the plurality of lenses and the plurality of line image sensors, and the operating section composes pieces of image information from the plurality of line image sensors.

In this case, the use of the plural line image sensors makes it possible to recognize the entire area of the board which extends longer than the effective reading length of one line image sensor and, in addition, permits the use of inexpensive, popular size line image sensors which are generally widely used in facsimile and the like. This provides for cost reduction with respect to the apparatus.

Further, according to the third, fourth, eleventh, and twelfth aspects, with an intention to solve the aforesaid issues, the moving device is operative to move the light source section and the recognizing section integrally with each other toward the board at a stop position.

In this case, the light source section and the recognizing section are moved without moving the board. This makes it possible to construct the apparatus generally to the length of the board and provides for size reduction of the apparatus. Furthermore, the moving velocity of the light source section and recognizing section relative to that of the board can be accurately controlled. This provides an advantage over the case in which the board is moved by a transport device, with the light source section and recognizing section being held stationary, in that the possibility of image expansion and contraction can be eliminated.

BRIEF DESCRIPTION OF THE DRAWINGS

These and other aspects and features of the present invention will become clear from the following description taken in conjunction with the preferred embodiments thereof with reference to the accompanying drawings, in which:

FIG. 6 is a flow chart showing a board recognizing method according to the embodiment of the invention.

DETAILED DESCRIPTION OF THE PREFERRED EMBODIMENTS

Figure 1:
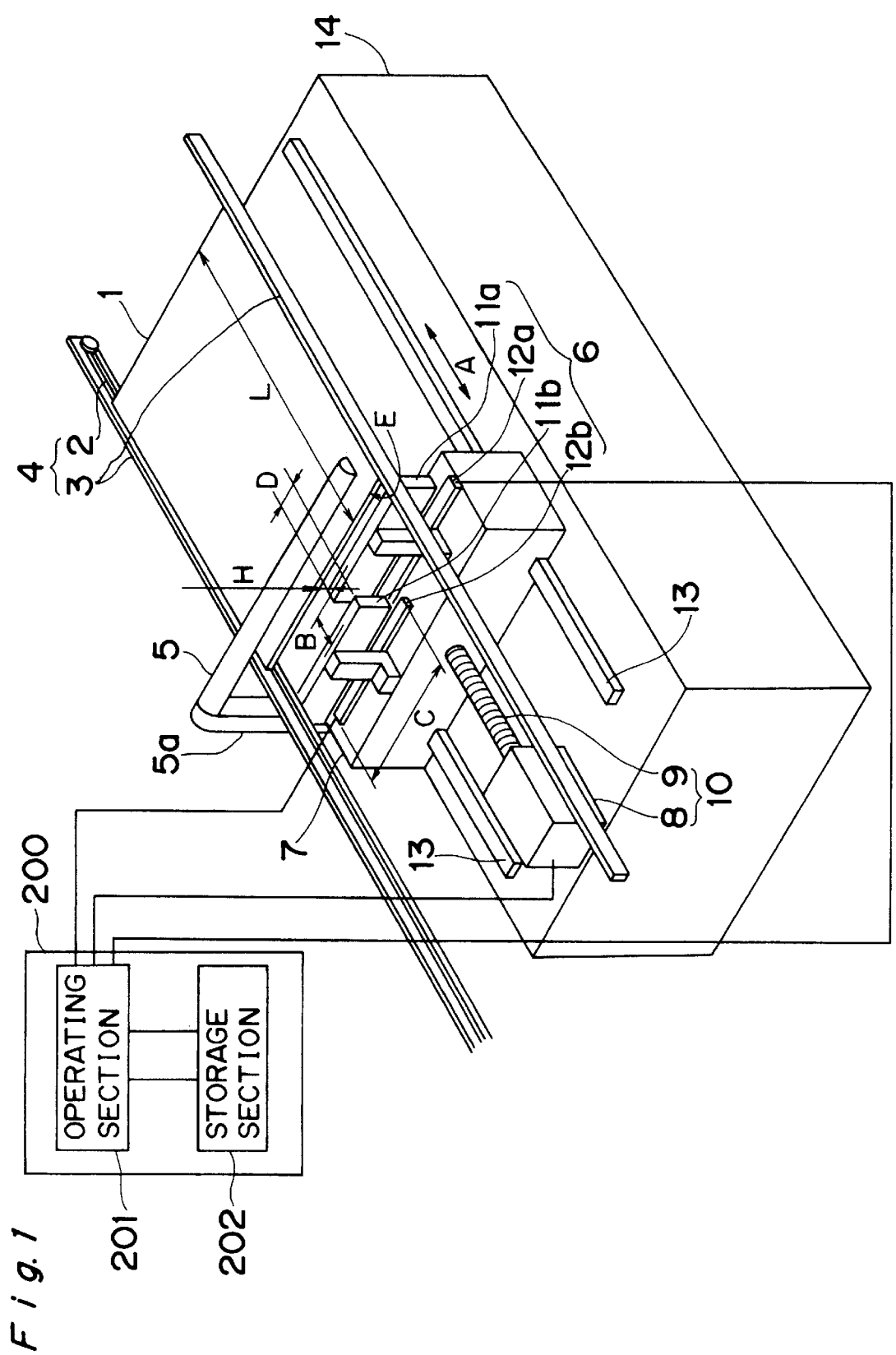
FIG. 1 is a perspective view showing a board recognizing apparatus and method according to an embodiment of the present invention.

Before the description of the present invention proceeds, it is to be noted that like parts are designated by like reference numerals throughout the accompanying drawings.

A board recognizing apparatus and a board recognizing method according to one embodiment of the present invention is explained with reference to FIGS. 1, 2, and 6.

Figure 2:
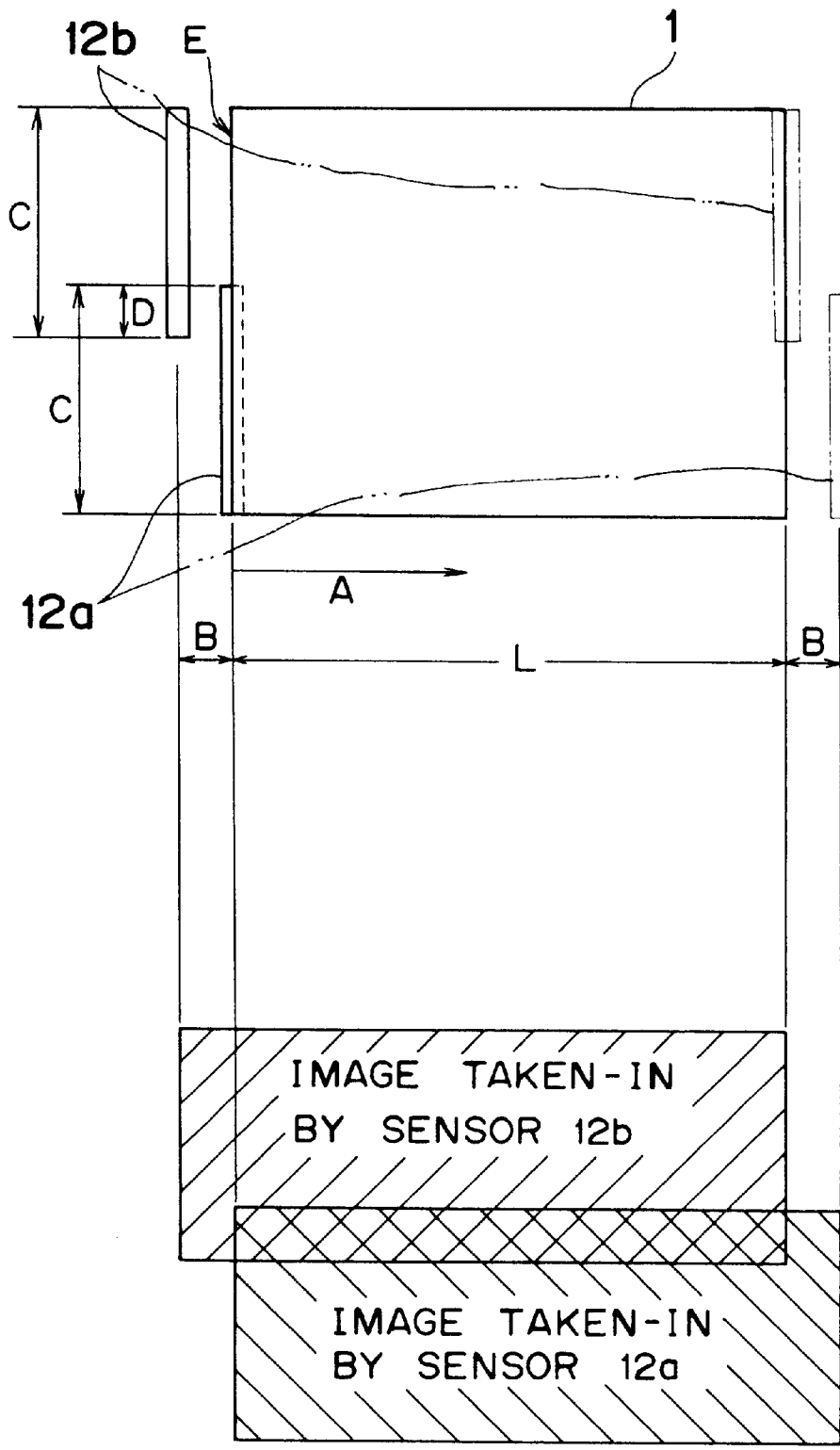
FIG. 2 is a diagrammatic view illustrating an image composing operation of the board recognizing apparatus.
Figure 3:
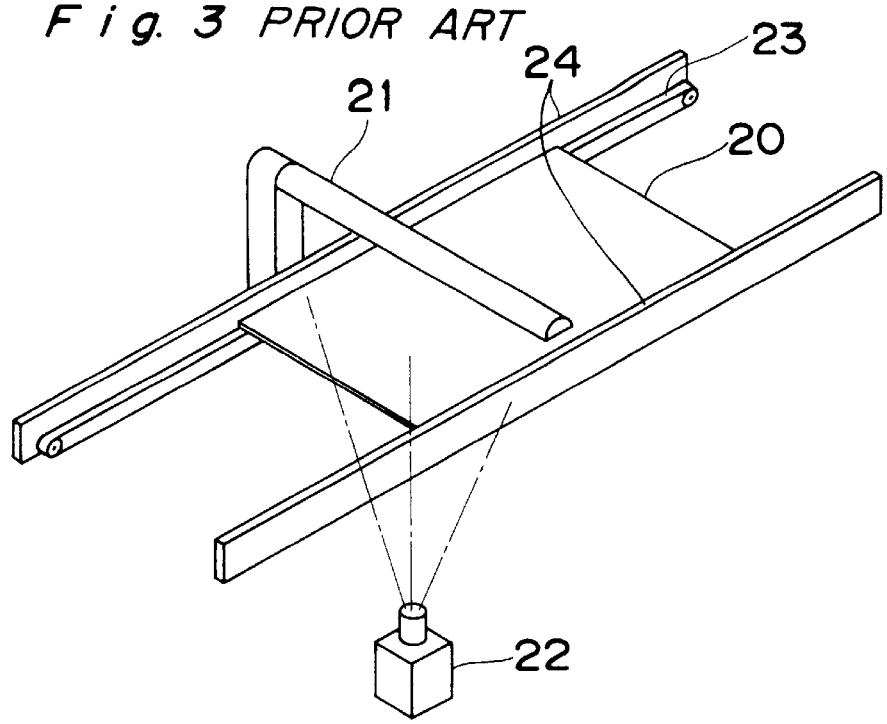
FIG. 3 is a perspective view of a conventional board recognizing apparatus.
Figure 4:
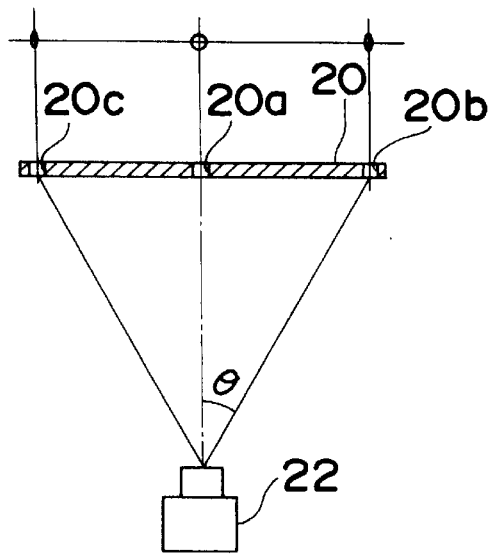
FIG. 4 is a diagram illustrating issues involved in the operation of the conventional board recognizing apparatus.
Figure 5:
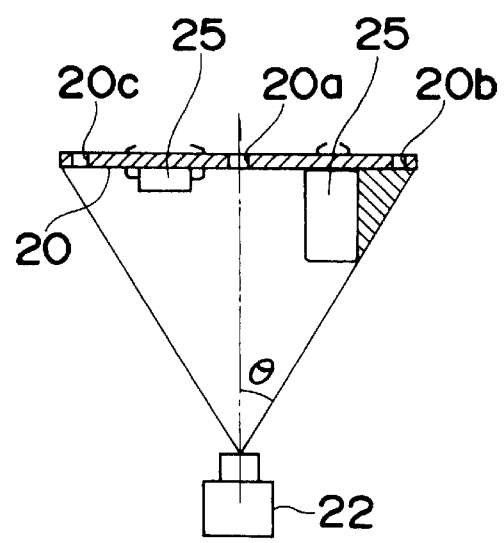
FIG. 5 is a diagram showing a further issue involved in the operation of the conventional board recognizing apparatus.

In FIG. 1, which shows a perspective view of the one embodiment, numeral 4 designates a transport device comprising a belt 2 and rails 3 for transporting a board 1 placed thereon. Numeral 14 designates a stationary base set beneath the transport device 4. Numeral 13 designate guide rails mounted on the upper surface of the stationary base 14 and in parallel with a transport direction in which the board 1 is transported by the transport device 4. Numeral 7 designates a moving carriage guided by the guide rails 13 for back and forth movement on the stationary base 14 in parallel with the transport direction of the transport device 4 in the directions of arrows A. Numeral 10 designates a moving carriage drive device provided on the stationary base 14 for moving the moving carriage 7 in parallel with the transport direction of the transport device 4 while issuing position signals from an encoder. The drive device 10 includes a servo motor 8 into which the encoder is incorporated and a feed screw 9 driven in both directions by the motor 8. Numeral 5 designates a light source section supported by a light source section supporting arm 5a secured to the moving carriage 7. The light source section 5 includes a light source which is disposed above the transport device 4 and which is set to the width of the transport device 4 in a direction perpendicular to the transport direction of the transport device 4. Numeral 6 designates a recognizing section including two contact type line image sensors 12a, 12b, each of length C. The line image sensors 12a, 12b extend in a direction perpendicular to the direction of movement of the moving carriage 7 and are mounted on the moving carriage 7 so as to fit within the distance between the guide rails 13 with an overlap area D and a space B provided between the line image sensors 12a, 12b. The recognizing section 6 also includes rod lenses 11a, 11b disposed above the sensors 12a, 12b. The rod lenses 11a, 11b each comprise a great number of SELFOCs ("SELFOC" is the trademark of Nihon Ita Garasu Kabushiki Kaisha for a gradient index lens), each of which is an optical system composed of an arrangement of a great number of gradient index lenses to form a single image as a whole and each of which functions as a thin microscope with a magnifying power of 1. The SELFOCs are arranged in vertically parallel relation. The distance H between each rod lens 11a, 11b and the board 1 is about 15 mm.

In this embodiment, the light source section 5 and the recognizing section 6 are arranged in generally the same position on the transport device 4. According to this arrangement, light rays entering the line image sensors 12a, 12b of the recognizing section 6 are light rays which are emitted vertically downward from the light source section 5 for passage through the holes of the board 1 from above and in a vertically downward direction, and which have thus passed through the rod lenses 11a, 11b vertically downward from above. Thus, the line image sensors 12a, 12b can accurately recognize the holes of the board 1.

The line image sensors are arranged in two separate units 12a, 12b. This makes it possible to use readily available and inexpensive short-length line image sensors 12a, 12b, thereby enabling recognition of a wider-width board 1.

The apparatus also includes a controller 200 connected to the line image sensors 12a, 12b, the servo motor 8, and the encoder of the servo motor for detecting the positions of the line image sensors 12a, 12b. The controller 200 has an operating section 201 for operating on data such as image information obtained from the line image sensors 12a, 12b and a storage section 202 for storing information of the positions of the line image sensors 12a, 12b, the image information, and the data operated on by the operating section 201, etc. The controller 200 also controls the driving of the servo motor 8 for moving the moving carriage 7.

Next, operation of the embodiment will be explained with reference to FIGS. 1 and 2.

As FIG. 1 illustrates, with the two line image sensors 12a, 12b constituting the recognizing section 6, the position of the front side image sensor 12a is brought into alignment with the rear end E of the board 1 at a stop position (step S1). The servo motor 8 of the moving carriage drive device 10 is driven to actuate the feed screw 9 to move the moving carriage 7 forward (step S2). That is, the feed screw 9 is rotated in one direction in accordance with the rotation of the servo motor 8 and then the moving carriage 7 is moved in one direction while a nut incorporated into the moving carriage 7 is engaged with the feed screw 9. The quantity of movement made in this case is a length L of the board 1 plus the space B. In a first stroke, i.e., a duration of movement in the one direction, for a distance corresponding to the space B, only the front side line image sensor 12a takes in image information with respect to the board 1 (step S3). In a next stroke, the two line image sensors 12a, 12b take in image information. In a final stroke for the distance corresponding to the space B, only the line image sensor 12b will take in image information with respect to the board 1.

The line image sensors 12a, 12b take in images within their respective share ranges and common data for the overlap area D within the effective take-in length C with a time difference corresponding to the space B. In this case, the line image sensors 12a, 12b can verify their respective positions through signals from the encoder of the servo motor 8.

Pieces of image information taken in by the line image sensors 12a, 12b are operated on by the operating section 201, so that the image information for the overlap area D is processed for composition (step S4). Thus, image data for the entirety of the board 1 is obtained (step S5).

According to the foregoing arrangement, as earlier stated, light rays entering the line image sensors 12a, 12b of the recognizing section 6 are light rays which are emitted vertically downward from the light source section 5 and which are passed through the holes of the board 1 from above and in a vertically downward direction, and which have thus passed through the rod lenses 11a, 11b vertically downward from above. In other words, the line image sensors 12a, 12b view the portion of the board 1 to be recognized from right below through the "SELFOCs" of the rod lenses 11a, 11b. Therefore, the line image sensors 12a, 12b can accurately recognize the holes of the board 1, thus eliminating the issue of image distortion at board edge portions which would occur when line sensors of the conventional compact type are used. Even where the board 1 has electronic components previously mounted on the underside thereof, there will be no occurrence of field-of-view shadow due to such electronic components, and the entirety of the board 1 can thus be accurately recognized.

The use of plural line image sensors makes it possible to recognize the entire area of the board which extends longer than the effective reading length of one contact type line image sensor and, in addition, permits the use of inexpensive, popular size contact line image sensors which are generally widely used in facsimile and the like. This provides for cost reduction with respect to the apparatus.

By arranging that the light source section and the recognizing section are moved without moving the board, it is none possible to construct the apparatus generally to the length of the board and this in turn provides for size reduction of the apparatus. Furthermore, the moving velocity of the light source section and recognizing section relative to that of the board can be more accurately controlled than the moving velocity of the transport device. This provides an advantage over the case in which the board is moved by a transport device, with the light source section and recognizing section being held stationary, in that the possibility of image expansion and contraction can be eliminated.

The board recognizing apparatus of the invention provides the following advantages.

(1). Board portions including median and edge portions can be accurately recognized, distortion-free.

(2). Previously mounted electronic components make no hindrance to board recognition.

(3). Recognition of larger boards is made possible through use, in plurality, of readily available, inexpensive short-length contact line image sensors which are generally widely used in facsimile and the like.

(4). Less space is required for board recognition, which provides for reduction of apparatus size.

(5). The issue of image expansion and contraction is eliminated.

Although the present invention has been fully described in connection with the preferred embodiments thereof with reference to the accompanying drawings, it is to be noted that various changes and modifications are apparent to those skilled in the art. Such changes and modifications are to be understood as include within the scope of the present invention as defined by the appended claims unless they depart therefrom.

What is claimed is:

1. A board recognizing apparatus for use in the recognition of a board having a hole for insertion therein of a lead of a component, the hole being formed in a direction of a thickness of the board, said board recognizing apparatus comprising:

a light source section having a light source disposed to extend in a direction to be transverse with respect to the board and to face one side of the board with an orientation with respect to the thickness direction of the board such that said light source is operable to illuminate the one side of the board in a direction substantially parallel to the thickness direction of the board;

a recognizing section including a lens disposed to extend in a direction to be transverse with respect to the board and to face an opposite side of the board and a line image sensor disposed to extend in a direction to be transverse with respect to the board and corresponding to said lens, said line image sensor being operable to receive light rays passing through said lens and to obtain image information based on the light rays;

a moving device connected to said light source section and said recognizing section, said moving device being operable to move both said light source section and said recognizing section relative to the board without moving said light source section and said recognizing section with respect to each other and to obtain position information; and an operating section for calculating overall image data for the board from the image information obtained by said recognizing section and the position information obtained by said moving device;

wherein said recognizing section is operable to obtain image information while said light source section and said recognizing section are moved by said moving device.

2. A board recognizing apparatus as claimed in claim 1, wherein said recognizing section comprises a plurality of said lens and a respective plurality of said line image sensor, each of said plurality of said line image sensor being operable to receive light rays passing through a respective one of said plurality of said lens and to obtain respective image information and wherein said operating section is operable to compose said respective image information from said plurality of said line image sensor.

3. A board recognizing apparatus as claimed in claim 2, wherein said moving device is operable to move said light source section and said recognizing section integrally with each other toward the board while the board is at a stationary position.

4. A board recognizing apparatus as claimed in claim 3, further comprising a transfer device for transferring the board, wherein said operating section is operable for calculating overall image data for the board from the image information obtained by said recognizing section and the position information obtained by said moving device while the board is located on said transfer device.

5. A board recognizing apparatus as claimed in claim 2, further comprising a transfer device for transferring the board, wherein said operating section is operable for calculating overall image data for the board from the image information obtained by said recognizing section and the position information obtained by said moving device while the board is located on said transfer device.

6. A board recognizing apparatus as claimed in claim 1, wherein said moving device is operable to move said light source section and said recognizing section integrally with each other toward the board while the board is at a stationary position.

7. A board recognizing apparatus as claimed in claim 6, further comprising a transfer device for transferring the board, wherein said operating section is operable for calculating overall image data for the board from the image information obtained by said recognizing section and the position information obtained by said moving device while the board is located on said transfer device.

8. A board recognizing apparatus as claimed in claim 1, further comprising a transfer device for transferring the board, wherein said operating section is operable for calculating overall image data for the board from the image information obtained by said recognizing section and the position information obtained by said moving device while the board is located on said transfer device.

9. A board recognizing method for use in the recognition of a board having a hole for insertion therein of a lead of a component, the hole being formed in a direction of a thickness of the board, and for use with a light source section having a light source disposed to extend in a direction to be transverse with respect to the board and to face one side of the board, a recognizing section including a lens disposed to extend in a direction to be transverse with respect to the board and to face an opposite side of the board and a line image sensor disposed to extend in a direction to be transverse with respect to the board and corresponding to the lens, a moving device connected to the light source section and the recognizing section, and an operating section, said board recognizing method comprising:

illuminating one surface of the board in a direction substantially parallel to the thickness direction of the board with the light source section;

receiving light rays passing through the lens with the line image sensor and obtaining image information with the line image sensor based on the light rays;

moving, with the moving device, both the light source section and the recognizing section relative to the board without moving the light source section and the recognizing section with respect to each other and obtaining position information with the moving device; and calculating, with the operating section during said moving, overall image data for the board from the image information obtained by the recognizing section and the position information obtained by the moving device.

10. A board recognizing method as claimed in claim 9, for use further with a plurality of lenses and a respective plurality of line image sensors, said method further comprising:

receiving light rays passing through the plurality of lenses with the respective plurality of line image sensors and obtaining respective image information with the respective plurality of line image sensors; and composing the respective image information from the plurality of line image sensors;

wherein said calculating of the overall image data is based on said composing of the respective image information.

11. A board recognizing method as claimed in claim 10, further comprising moving the light source section and the recognizing section integrally with each other toward the board while the board is at a stationary position.

12. A board recognizing method as claimed in claim 11, for further use with a transfer device, wherein said calculating is performed while the board is located on the transfer device.

13. A board recognizing method as claimed in claim 10, for further use with a transfer device, wherein said calculating is performed while the board is located on the transfer device.

14. A board recognizing method as claimed in claim 9, further comprising moving the light source section and the recognizing section integrally with each other toward the board while the board is at a stationary position.

15. A board recognizing method as claimed in claim 14, for further use with a transfer device, wherein said calculating is performed while the board is located on the transfer device.

16. A board recognizing method as claimed in claim 9, for further use with a transfer device, wherein said calculating is performed while the board is located on the transfer device.

17. A board recognizing apparatus for use in the recognition of a board having a hole for insertion therein of a lead of a component, the hole being formed in a direction of a thickness of the board, said board recognizing apparatus comprising:

a light source section for passing light through the hole of the board in a direction substantially parallel to the thickness direction of the board;

a recognizing section for obtaining image information of the board based on the light passed through the hole of the board by said light source section;

a moving device for moving both said light source section and said recognizing section relative to the board without moving said light source section and said recognizing section with respect to each other and for obtaining position information of said light source section and said recognizing section; and an operating section for calculating overall image data for the board based on the image information obtained by said recognizing section and the position information obtained by said moving device.

18. A board recognizing apparatus as claimed in claim 17, wherein said light source section is operable for passing light through the holes of the board while said moving device moves said light source section and said recognizing section, and said recognizing section is operable for obtaining image information of the board while said moving device moves said light source section and said recognizing section.

19. A board recognizing apparatus as claimed in claim 18, wherein said operating section is operable for calculating overall image data while said moving device moves said light source section and said recognizing section.

20. A board recognizing apparatus as claimed in claim 17, wherein said operating section is operable for calculating overall image data while said moving device moves said light source section and said recognizing section.

21. A board recognizing apparatus as claimed in claim 17, wherein said recognizing section comprises:

a lens for receiving, and passing therethrough, the light passed through the holes of the board; and a line image sensor for receiving the light passing through said lens and for obtaining the image information of the board.

22. A board recognizing apparatus as claimed in claim 21, wherein said recognizing section comprises a plurality of said lens and a respective plurality of said line image sensor, each of said plurality of said line image sensor is operable for receiving light passing through a respective one of said plurality of said lens and for obtaining respective image information and wherein said operating section is further operable for composing said respective image information from said plurality of said line image sensor and for calculating the overall image data based on said respective image information composed by said operating section.

* * * * *